United States Patent [19]

Kawaguchi

[11] Patent Number: 4,678,886
[45] Date of Patent: Jul. 7, 1987

[54] AUTOMATIC SOLDERING DEVICE

[76] Inventor: Seiji Kawaguchi, 22-203, Nishiminecho 21, Ota-ku, Tokyo, 146, Japan

[21] Appl. No.: 810,338
[22] PCT Filed: Feb. 25, 1985
[86] PCT No.: PCT/JP85/00083
§ 371 Date: Nov. 13, 1985
§ 102(e) Date: Nov. 13, 1985
[87] PCT Pub. No.: WO85/03866
PCT Pub. Date: Sep. 12, 1985
[51] Int. Cl.⁴ ........................... B23K 1/02; B23K 1/04
[52] U.S. Cl. ................................. 219/85 R; 219/85 G
[58] Field of Search ................. 219/85 R, 85 D, 85 F, 219/85 CA, 85 CM, 85 G; 228/52, 53

[56] References Cited

FOREIGN PATENT DOCUMENTS 52-36853 9/1977 Japan .
54-23056 2/1979 Japan .
57-50275 3/1982 Japan .

OTHER PUBLICATIONS

International Search Report, PCT/JP85/00083.

*Primary Examiner*—Harold Broome
*Assistant Examiner*—Lincoln Donovan
*Attorney, Agent, or Firm*—Stefan J. Klauber

[57] ABSTRACT

An automatic soldering device is characterized in that the end portion (solder nozzle) 30 of a feeding tube 10 for guiding thread solder 22 is supported near and directed toward an iron tip by means of a holder 23, the base of which is fixed by means of a spring 25 to a base plates 24 and 54 that are freely adjustable positionwise relative to the iron tip 9, and that the angle of the base plates 24 and 54 relative to the iron tip can be adjusted in all directions by adjusting the protrusion of plural screws provided on the base plates 24 and 54 so that thread solder 22 can be supplied to the iron tip 9 in a suitable manner irrespective of the wear thereof.

8 Claims, 8 Drawing Figures

AUTOMATIC SOLDERING DEVICE

FIELD OF THE INVENTION

The present invention relates to an automatic soldering device which enables soldering work at a higher precision and efficiency.

BACKGROUND OF THE INVENTION

Soldering has conventionally been done manually in most of the cases because soldering conditions vary greatly in each case. A device which meets such diversified requirements would inevitably become complicated and large in size. Moreover, merits of automatized soldering device are not fully appreciated in certain areas. In such areas they manage to do soldering works manually.

On the other hand, it is quite difficult to obtain uniform soldering with excellent luster finish. Need for automatic soldering device which can replace the manual operations was mounting, particularly in industries relating to products of greater added value.

The present inventor developed an automatic soldering device which comprises a soldering iron which is moved vertically by an air cylinder, a separate solder feeding means to feed thread-like solder at timing aligned to said vertical movement in two steps, i.e. primary and secondary feedings in a given amount, under controlled preheating time and heating time.

The present invention aims to improve the automatic soldering device contrived by the present inventor and to achieve higher precision and efficiency in soldering operations.

DISCLOSURE OF THE INVENTION

In order to achieve the object of the present invention, a soldering iron is lowered toward the surface to be worked by means of an air cylinder. A given amount of thread solder is supplied from a solder feeder which is separately installed via a tube at timing aligned with the lowering of the soldering iron. Under controlled preheating and heating times for the solder iron, thread solder is supplied in two steps to the tip attached in advance to the lower end of the soldering iron.

The automatic soldering device of above construction is characterized in that the tip of the feeding tube for guiding the thread solder is directed toward the end of the iron tip and supported by a holder near the tip, the base of the holder is held by a base plate by means of a spring, the base plate being freely adjustable as to its lowering position relative to the iron tip, and the base plate can be freely adjusted in angles vertically, horizontally and obliquely with respect to the solder tip by the degree of projection of plural adjusting screws provided on the base plate.

According to the present invention, the best positions of the iron tip and the solder line can be aligned in optimum relation. Automatic soldering of high precision and efficiency becomes possible notwithstanding the wear of the iron tip.

In the automatic soldering device of the present invention, the tip of an air tube for injecting air is supported by said holder in the same manner as the feeding tube for feeding thread solder. Further, a sludge receiving port connected to a vacuum hose is opposed to the iron tip in a freely approachable manner.

According to the present invention, the soldering iron can be cleaned by blowing off sludge, etc. with air injected from the air tube which is opposed to the iron tip and by drawing it by suction into the sludge receiving port for removal.

Further in the present invention, the holder which supports each tip of the thread solder feeding tube and the air injection tube is positioned slightly below the end of the iron tip before the iron tip comes in contact with the work surface, so that when the tip touches the work surface, the solder thread can be supplied at the iron tip.

According to this invention, it becomes possible to prevent undesirable state on the surface which might otherwise be caused by the contact of thread solder with the surface at the secondary soldering stage.

PREFERRED EMBODIMENT OF THE INVENTION

The present invention will now be described referring to the attached drawings.

Figure 1:
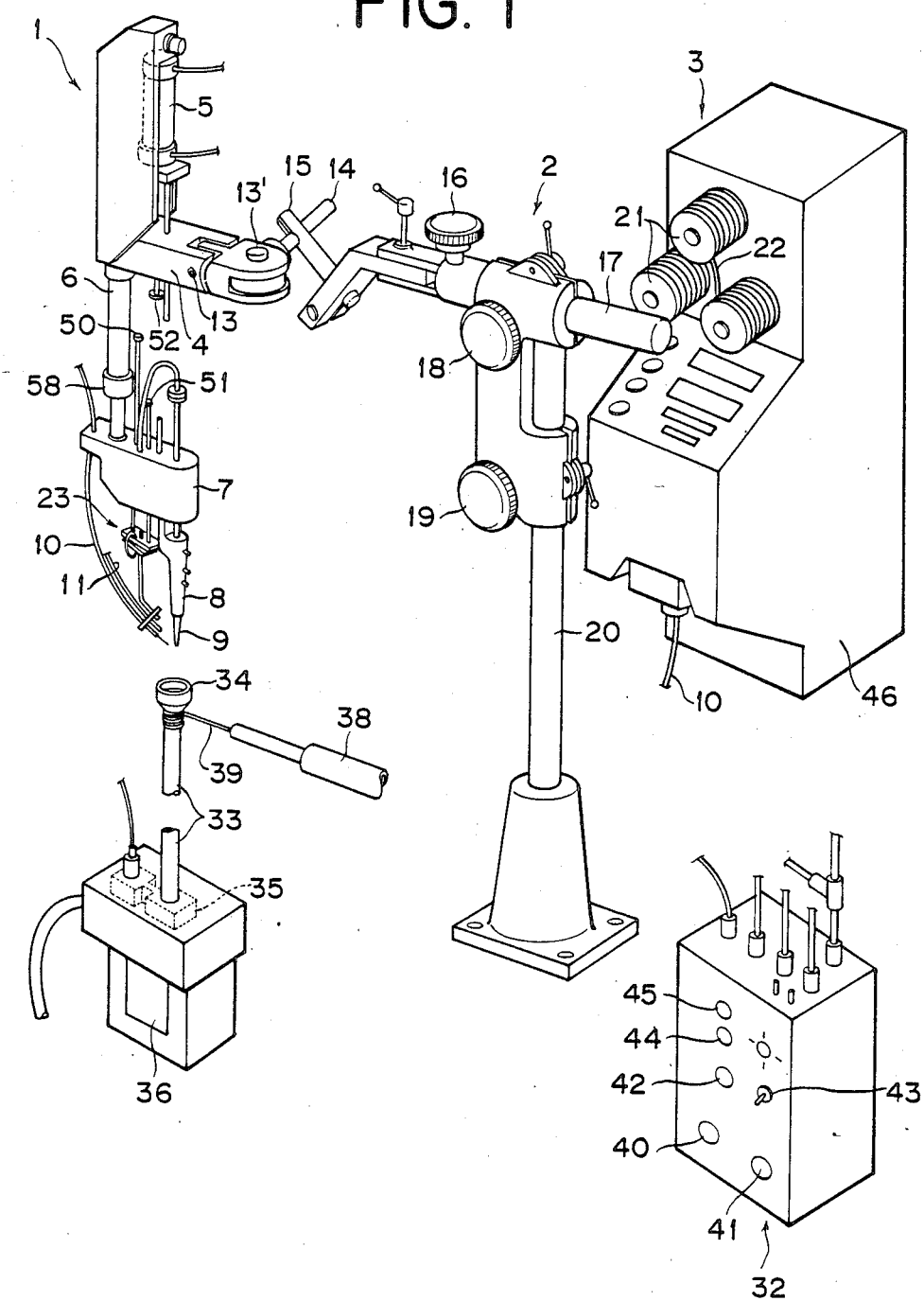
FIG. 1 shows a schematic perspective view of the automatic soldering device according to the present invention.
Figure 2:
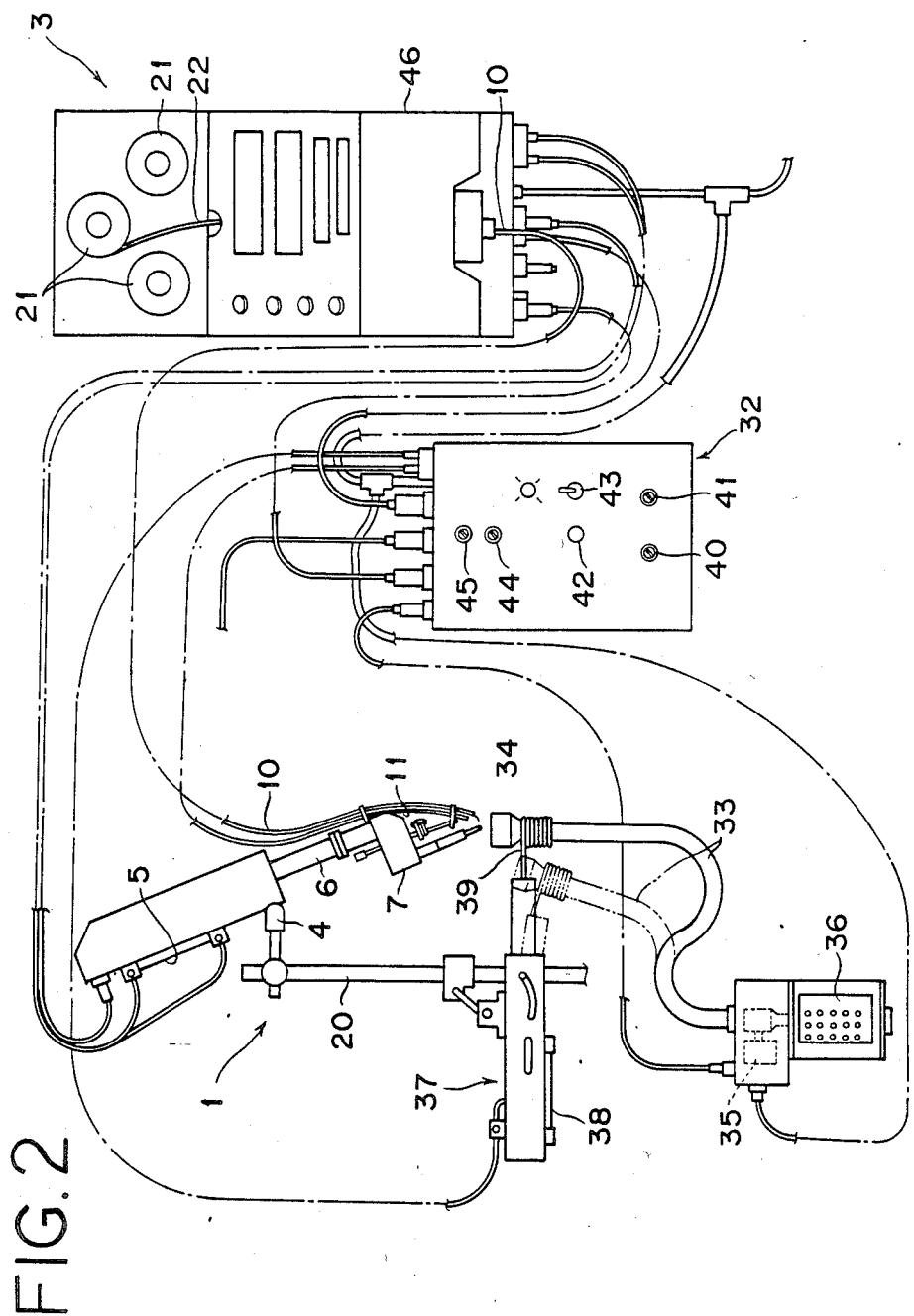
FIG. 2 is a schematic front view to show connection of components shown in FIG. 1.
Figure 3:
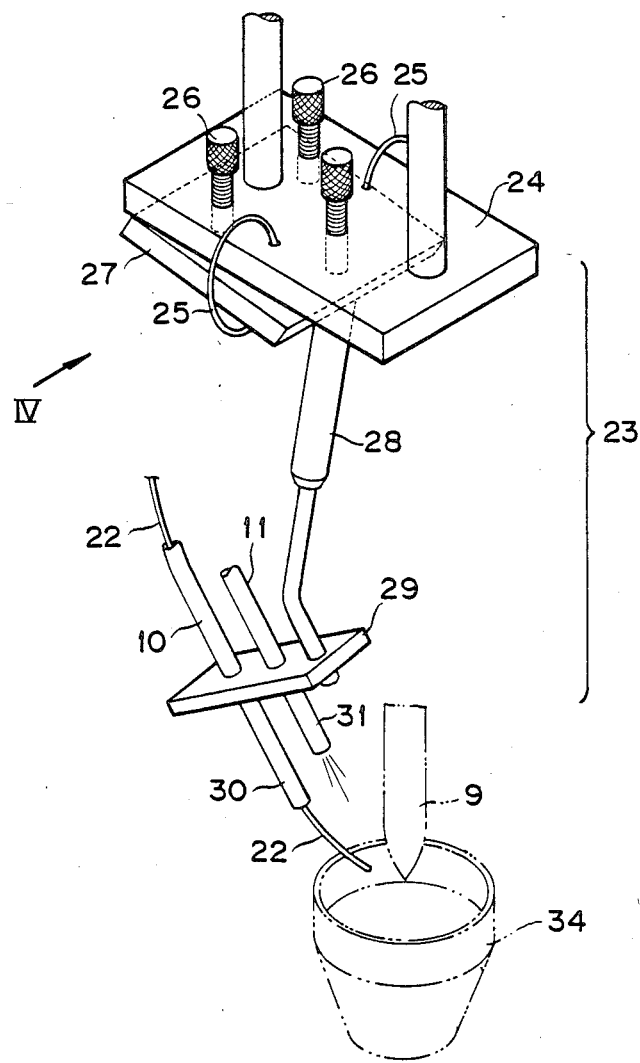
FIG. 3 is an enlarged perspective view to show the bottom part of the solder iron unit.
Figure 4:
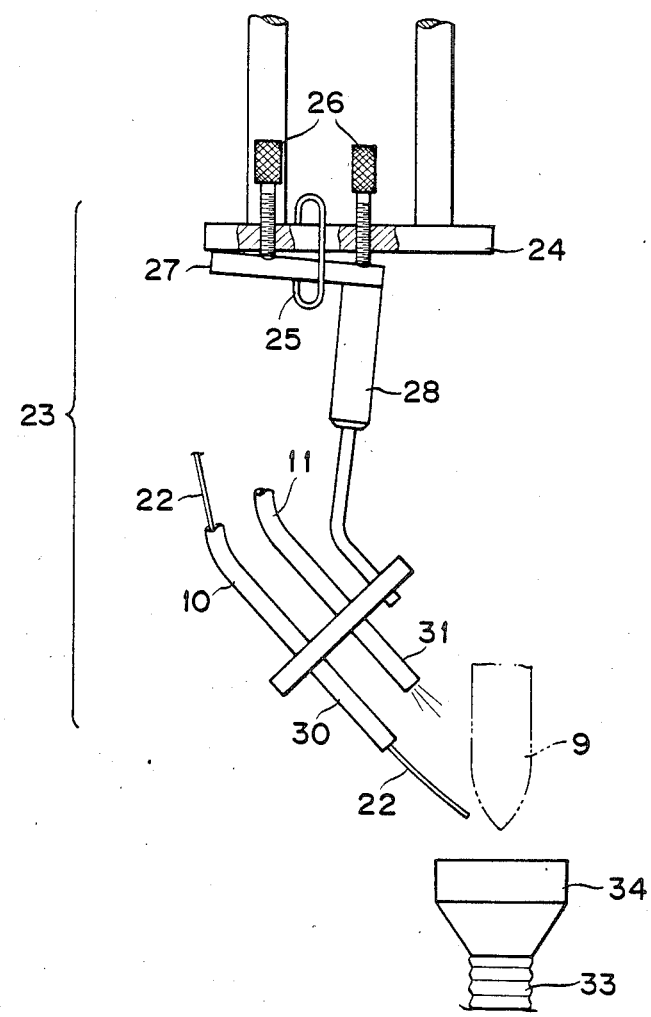
FIG. 4 is a side view viewed from the arrow IV in FIG. 3.

Referring to FIGS. 1 and 2, the basic construction of the present invention will be explained. The automatic soldering system comprises a soldering iron unit 1, a stand unit 2 and a solder feeder 3. The soldering iron unit 1 is provided with an air cylinder 5 above its first base 4. The movement of the air cylinder 5 is transmitted to a second base 7 via a suspension rod 6 and whereby a solder iron 8 and iron tip 9 attached to the second base 7, a feeding tube 10 and an air tube 11 to be described below are integrally movable in the vertical direction. At one end of the first base 4 is attached a mounting arm 14 which is adjustable both in the vertical and horizontal directions by bolts 13 and 13'. The stand unit 2 supports the solder iron unit 1 of the above construction at a predetermined height and comprises a mount 15 for supporting the mounting arm 14, a handle 16 for the horizontal position adjustment, a side rod 17, a handle 18 for forward/backward adjustment, a handle 19 for vertical adjustment, and a pole 20. While supporting the soldering iron unit 1, the stand unit 2 can easily be adjusted in its position vertically, horizontally as well as in the direction approaching to and from the drawing sheet. Micro-adjustment is also possible. The solder feeder 3 supplies via the feeding tube 10 a predetermined amount of thread solder 22 to the iron tip 9 by paying out the thread solder 22 convoluted with a bobbin 21. Referring further to FIGS. 3 and 4 in conjunction with FIGS. 1 and 2, the essential portions of the soldering iron unit 1 will be explained below.

The second base 7 supported at the lower end of the suspension rod 6 supports a holder 23 while supporting the soldering iron 8 and the iron tip 9 as mentioned above. The holder 23 supports the end of the feeding tube 10 at a near portion of the iron tip 9 and orients the same toward to an end portion of the iron tip 9. The base of the holder 23 is held by a base plate 24 via a spring 25 and the base plate 24 can freely adjust its lowering position with respect to the iron tip 9. Plural screws 26 (3 adjusting screws are shown in the drawing) are provided for adjustment on the base plate 24. The length of the screws 26 protruding downward from the base plate 24 determines the angle of a holder plate 27 in all directions including horizontal, vertical and obliquely with respect to the iron tip 9, the holder plate 27 fixing the base of the holder 23. More particularly, the holder plate 27 is securely attached at its bottom surface with a holder rod 28, which in turn securely supports the end portion (solder nozzle) 30 of said feeding tube 10 by means of an end holder 29 provided at the end of the holder rod 28. The spring 25 is in the letter C shape as shown in FIG. 3 and is provided in a pair on both sides at the back of the base plate 24 in a manner to hold both of the holder plate 27 and the base plate 24 in stack by its resilience.

The end holder 29 supports the end portion (air nozzle) 31 of the air tube 11 in the same manner as the feeding tube 10. The air tube 11 is connected to a cleaner adjusting means 32 and injects "air" from the end portion (air nozzle) 31 toward the end of the iron tip 9. A sludge receiving port 34 connected to a vacuum hose 33 is provided opposing to the air tube 11 in a freely approachable manner with respect to the iron tip 9. The vacuum hose 33 is connected to a vacuum source (not shown) and enables a suction force to act in the proximity of the sludge receiving port 34 by opening/closing of a solenoid valve 35. Sludge blown off from the iron tip 9 by the air injected from the end portion 31 of the air tube 11 will be sucked and retained in a vacuum pot 36. The sludge receiving port 34 is fixed at the end of a rod 39 which can be moved fore and aft and be swang by an air cylinder 38 contained in a slide unit 37. When the iron tip 9 is soldering on the work surface (not shown) the sludge receiving port 34 recedes from the near portion of the work surface and when the iron tip 9 is not opposed to the work surface, then the port 34 can be moved near the tip 9.

As shown in FIGS. 1 and 2, the cleaner adjustment means 32 is provided with various buttons and switches including, as shown, a button 40 for adjusting the air injection timing, a button 41 for adjusting the length of time of air injection, a start button 42, a switch for power source 43, a button 44 for adjusting the amount of air injection, and a button 45 for adjusting the cylinder speed.

Figure 5:
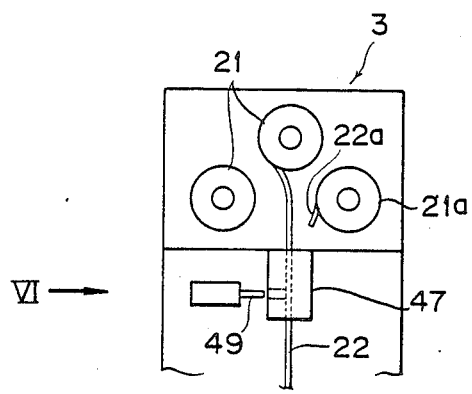
FIG. 5 is an enlarged view of the portion of the solder feeder in the automatic solder device shown in FIG. 1.

As mentioned above, the solder feeder 3 pays out "a given amount" of thread solder 22 convoluted with the bobbin 21 and supplies the same to the iron tip 9. For this purpose, a plurality of bobbins 21 can be mounted on the upper end of a box-like main body 46, inside which is provided a solder connecting means 47 as shown in FIG. 5. When one of the bobbins 21 has almost paid out all its thread solder 22, another bobbin 21a pays out the thread solder 22a anew. In the sloder connecting means 47, the ends of both the thread solder 22 and new thread solder 22a are abutted and positioned by means of a guide throughhole 48. An iron 49 provided horizontally movable toward the abutment portion of the both threads 22 and 22a thereof heats and welds the threads 22, 22a to thereby automatically and continuously supply the solder thread 22 over a long period of time.

A stopper 50 for determining the position of a secondary stage soldering and a button 51 for adjusting the vertical position of the tip 9 are provided on the upper surface of the second base 7. A stroke adjusting bolt 52 is attached to the bottom surface of the first base 4. A lock nut 58 is fixed to the suspension rod 6. The holder 23 is so positioned that the thread solder 22 can be supplied to a location slightly below the iron tip 9 immediately before the second base 7 is lowered and the iron tip 9 touches the work surface. The holder 23 is shifted slightly rearward of the previous position so that the thread solder 22 can be supplied to the end of iron tip 9. In this way, the tip of the thread solder 22 is prevented from reaching below the farthermost end of the end of iron 9 and thus from contacting with the work surface, whereby preventing the risk of interfering with, moving or damaging the terminal, lead wire, IC chip, etc. on the work surface.

The operation of the automatic soldering device will now be explained. By operating the air cylinder 5 of the soldering iron unit 1 while supporting the unit 1 at a predetermined height by means of the stand unit 2, the second base 7 together with other members such as the holder 23 attached thereto will be lowered toward the work surface via the suspension rod 6. In the meantime, the solder feeder 3 pays out a given amount of the thread solder 22 from the bobbin 21 via the feeding tube 10. Said given amount of thread solder 22 will be paid out to project slightly below the end of iron tip 9 from the end (solder nozzle) 30 of the feeding tube 10 supported by the holder. The iron tip 9 is also lowered together with the solder nozzle 30. The solder nozzle 30 and the thread solder 22 will stop lowering as they touch the work surface, but the iron tip 9 will be lowered farther down to come in contact with the portion of thread solder 22 which is projecting downward slightly and melts the solder. In other words, the solder is melted to "wet" the iron tip 9 ("primary soldering"). The iron tip 9 continues its descend to reach the work surface. As the work surface is instantaneously heated, the solder feeder 3 again pays out a given amount of thread solder 22. In this manner, the solder can be melted at the end of iron tip 9 under the optimal conditions for soldering ("secondary soldering"). Thus, as the holder 23 is so arranged by the stopper 50 for determining the secondary soldering position and the like mechanisms that [during the primary soldering] it comes to a position slightly ahead of the end of iron tip 9 and [during the secondary soldering] it comes to a position slightly behind the iron tip 9, the position of the iron tip 9 and the position of thread solder supply can be controlled to be aligned strokewise. Unexpected damages which may occur as the members other than the iron tip 9 come in contact with the work surface can be prevented.

In case excessive solder is adhering to the end of iron tip 9 after soldering is completed, air is supplied under pressure to the air tube 11 at a timing and for a period of time determined by the button 40 for adjusting air injection timing and button 41 for adjusting the air injection time of the cleaner adjusting mechanism 32. Since the air tube 10 is positioned near the iron tip 9 and oriented thereto at its end, air comes out from the end portion (air nozzle) 31 and blows away the excessive solder or the sludge from the tip 9. At the same time, the solenoid valve 35 causes suction force to act near the sludge receiving port 34 via the vacuum hose 33, so that scattered sludge will be sucked into the sludge receiving port 34 and introduced into the vacuum pot 36 via the vacuum hose 33. Thus end of iron tip 9 remains clean at all times.

Figure 6:
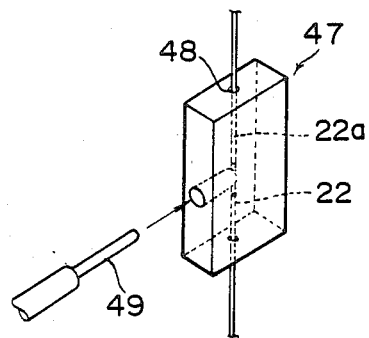
FIG. 6 is a perspective view viewed from the arrow VI in FIG. 5 to show the essential portion.

By repeating the primary and secondary solderings, automatic soldering becomes possible. Since the iron tip 9 becomes worn out and as it wears, its position (stroke) will be varied. In order to align the iron tip 9 and the thread solder 22, any one of the adjusting screws 26 (or each of them) shown in FIGS. 3 and 4 is turned to cause its leg to protrude downward from the base plate 24. Depending on the extent of protrusion, the holder plate 27 shifts its position against the pressing force of the spring 25 and the end holder 29 suspended by the holder rod 28 of the holder plate 27 will shift its direction at any angle in any arbitrary direction. Thus, microadjustment for the optimum position becomes possible for the positions of iron tip 9, work surface, supply of the thread solder 22, etc. As the automatic soldering continues, the thread solder 22 of one of the bobbins 21 will eventually become totally used up. As shown in FIGS. 5 and 6, the connecting means 47 provided on the solder feeder 3 will automatically connect the new supply of thread solder 22a with the bit remaining of thread solder 22 in the first bobbin by heating and welding and continue to supply the iron tip 9 with a required amount of solder.

Figure 7:
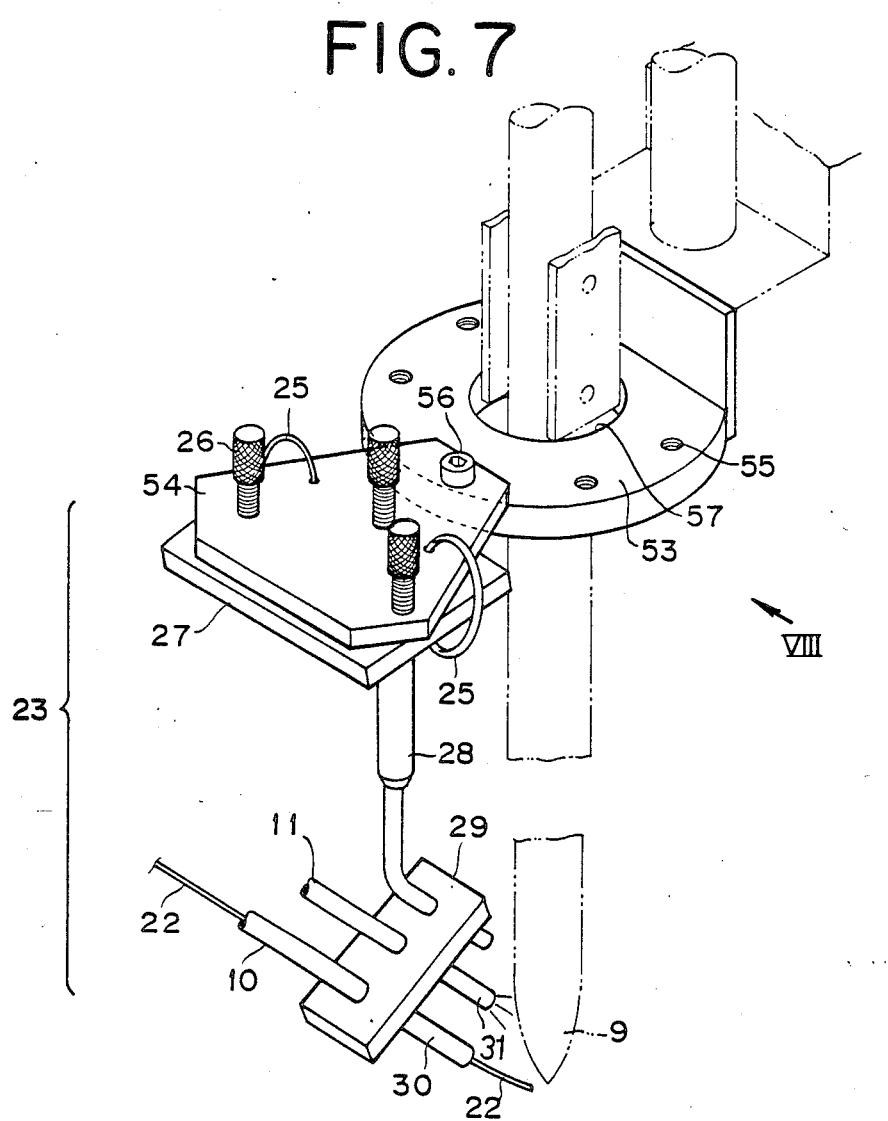
FIG. 7 is an enlarged perspective of another embodiment showing the end portion (bottom portion) of the solder iron unit which corresponds to the one shown in FIG. 3.
Figure 8:
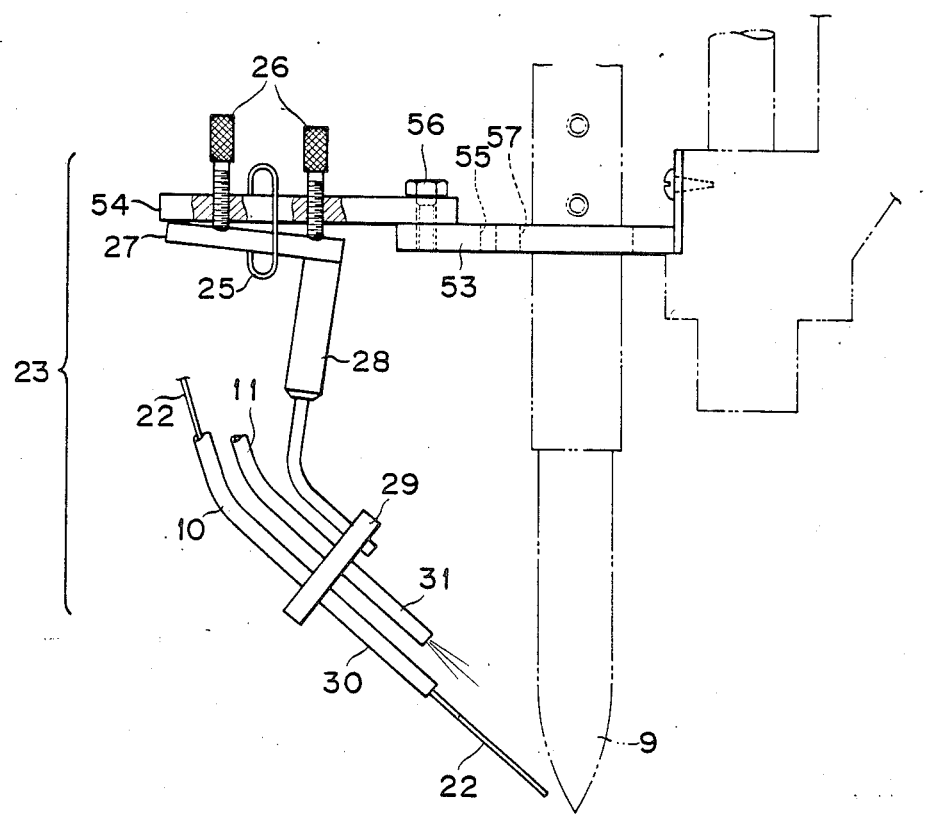
FIG. 8 is a side view viewed from the arrow VIII in FIG. 7.

Referring now to FIGS. 7 and 8, a second embodiment with different means of aligning the iron tip and the solder line will be explained. In the first embodiment shown in FIGS. 3 and 4, the holder plate 27 is directly placed beneath the base plate 24 by means of the spring 25. In the second embodiment, however, the "base plate" comprises a first base plate 53 substantially disclike shape and a second base plate 54 which is fixed to the periphery of the first base plate 53 by means of screws at any arbitrary positions. The holder plate 27 is positioned and pressed against the bottom surface of the second base plate 54 by the spring 25. The first base plate 53 has plural holes 55 on its peripheral side so as to support and secure the second base plate 54 by fixing screws 56 at any arbitrary positions. By suitably selecting the fixing holes 55, the holder plate 27, the end holder 29, the feeding tube 10 which is supported by these members and the air tube 11 may all be arbitrarily positioned around the iron tip 9. In this embodiment, the iron tip 9 is provided penetrating the throughhole 57 of the first base plate. The position of the iron tip 9 will be lowered by an actuating means to a certain position, and the holder 23 will be lowered to a height in alighment with the position of the tip 9.

In case it is difficult to correctly position the end portion (air nozzle) 31 of the air tube 11 supported by the end holder 29 and the end portion (solder nozzle) 30 of the feeding tube 10 because of the conditions of the work surface, the holder plate 27, holder rod 29, the end holder 29, the air tube 11 and the feeding tube 10 will all be shifted horizontally to different positions together with the second base plate 54 by suitably selecting the fixing holes 55 of the first base plate 53 and using the screws 56 to oppose the iron tip 9 at a suitable position relative to the same. The thread solder 22 can be supplied from this position. The remaining construction, operation and effect of the second embodiment are substantially the same with the first embodiment; the same parts are denoted by the same reference numbers and duplicated explanation is omitted.

APPLICABILITY IN THE INDUSTRY

As has been described in the foregoing, the present invention enables alignment of the iron tip and the thread solder, cleaning of the iron, connection of the solder threads, and positional adjustment of the supply of the thread solder both in the primary and secondary solderings, achieving higher precision and efficiency. The automatic soldering device of the present invention will therefore be very advantageously used in electronics products including those for airplane industry and aerospace industry where greater added value can be expected.

What we claim:

1. In an automatic soldering system wherein soldering is conducted by lowering a soldering iron having a tip toward a work surface by means of an air cylinder, supplying thread solder in a predetermined amount from a solder feeder installed separately via a feeding tube at a timing coincided with the lowering of the iron, controlling both the preheating and heating times of the iron and dividing the supply of thread solder in two stages, an automatic soldering device characterized by the fact that an end portion of said feeding tube for guiding the thread solder is supported near and directed toward the iron tip by means of a holder including a holder plate and said holder plate is supported by a base plate by means of a spring, and the holder can be freely adjusted with respect to its position and angularity horizontally, vertically and obliquely relative to the iron tip in all directions by adjusting the protrusion of plural screws provided on the base plate to modify the force exerted by said spring upon said holder plate.

2. The automatic soldering device as claimed in claim 1 wherein said device has an air tube and said holder supports an end portion of the air tube for air injection as well as the feeding tube, and a sludge receiving port which is connected to a vaccum hose is positioned opposing the iron tip in a freely approachable manner with respect thereto.

3. In an automatic soldering system wherein soldering is conducted by lowering a soldering iron having a tip toward a work surface by means of an air cylinder, supplying thread solder in a predetermined amount from a solder feeder installed separately via a feeding tube at a timing coincided with the lowering of the iron, controlling both the preheating and heating times of the iron and dividing the supply of thread solder in two stages, an automatic soldering device characterized by the fact that an end portion of said feeding tube for guiding the thread solder is supported near and directed toward the iron tip by means of a holder having a lower end and the lower end of said holder is supported by a base plate by means of a spring, and the holder can be freely adjusted horizontally, vertically and obliquely with respect to its position and angularity relative to the iron tip in all directions by adjusting the protrusion of plural screws provided on the base plate and said base plate comprises a first base plate substantially in a disc shape and a second base plate attached to the periphery of the first base plate by a screw at a postiion adjustable horizontally, and the lower end of said holder is supported by the second base plate and is capable of feeding the thread solder to any arbitrary position around the iron tip in correspondence with the horizontal positional changes of the second base plate.

4. The automatic soldering device as claimed in claim 3, wherein said device has an air tube and said holder supports an end portion of the air tube for air injection as well as the feeding tube, and a sludge receiving port which is connected to a vacuum hose is positioned opposing the iron tip in a freely approachable manner with respect thereto.

5. An automatic soldering device as claimed in claim 1, wherein said holder is so positioned that the thread solder can be supplied to a location slightly below an end of the iron tip before the iron tip touches the work surface and that the thread solder can be supplied to the end of the iron tip when the tip touches the work surface.

6. An automatic soldering device as claimed in claim 2, wherein said holder is so positioned that the thread solder can be supplied to a location slightly below an end of the iron tip touches the work surface and that the thread solder can be supplied to the end of the iron tip when the tip touches the work surface.

7. An automatic soldering device as claimed in claim 4, wherein said holder is so positioned that the thread solder can be supplied to a location slightly below an end of the iron tip before the iron tip touches the work surface and that the thread solder can be supplied to the end of the iron tip when the tip touches the work surface.

8. An automatic soldering device as claimed in claim 5, wherein said holder is so positioned that the thread solder can be supplied to a location slightly below an end of the iron tip before the iron tip touches the work surface and that the thread solder can be supplied to the end of the iron tip when the tip touches the work surface.

* * * * *